E. E. HARGREAVES.

VENTILATING CARS.

No. 7,010. Reissued March 21, 1876.

Attest
Chas Thurman
R. A. Dyer.

Inventor.
Edwd E. Hargreaves
by Thos S. Sprague
Atty

N. PETERS, PHOTO-LITHOGRAPHER, WASHINGTON, D. C.

UNITED STATES PATENT OFFICE.

EDWARD E. HARGREAVES, OF SARNIA, CANADA.

IMPROVEMENT IN VENTILATING CARS.

Specification forming part of Letters Patent No. 170,364, dated November 23, 1875; reissue No. 7,010, dated March 21, 1876; application filed January 25, 1876.

*To all whom it may concern:*

Be it known that I, EDWARD E. HARGREAVES, of Sarnia, in the county of Lambton and Dominion of Canada, have invented an Improvement in Ventilating Cars, of which the following is a specification:

The nature of my invention relates to an improvement in ventilating railway-cars, and has for its object withdrawing the air from the interior of the car at as many points as may be desired, thereby creating, to a certain extent, a vacuum, which is filled with fresh, uncontaminated air from the outside, effecting, as often as is necessary or desirable, a complete change in the atmosphere of the car, while, at the same time, the interior of the car is kept free from dust, and without creating drafts, which would be detrimental to the health and comfort of the occupants.

The invention consists in the combination and arrangement of devices to produce the desired effect, as more fully hereinafter set forth.

Figure 1:
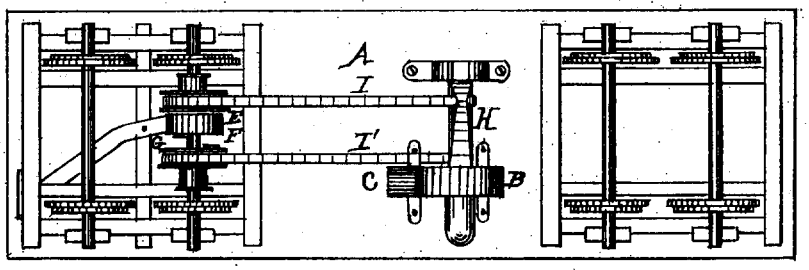
Figure 2:
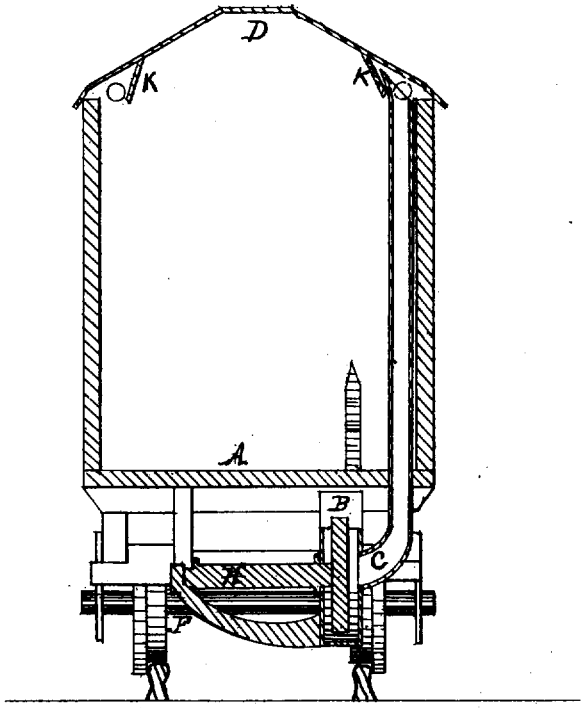

In the drawings, Figure 1 is a plan view of the under side of the floor or platform of the car, showing the exhaust-fan, and its connection with the axle, by the rotation of which the fan is operated. Fig. 2 is a vertical cross-section of the car on the line of the fan in Fig. 1.

Like letters indicate like parts in each figure.

A represents the platform or floor of a railway-car, to the under side of which is firmly secured a rotary exhaust-fan, B, which communicates with the pipe C in the interior of the car, and which terminates near the ceiling or under the roof D of the car; or a series of branching pipes may be so arranged as to withdraw the air from as many points in the top of the car as may be desired, but the free open ends of such pipes should terminate just below the ceiling, where the mouths are hidden behind the false ceiling K, extending the whole length of the car. This false ceiling should be perforated with a series of small openings to allow the air to pass freely through them to the mouths of the pipes in such small currents as to create no susceptible draft, to the annoyance of the passengers. These openings may be provided with connected slides or valves, by means of which the openings may be closed at will.

E E are clutch-pulleys, sleeved on the axle F, and so arranged that one or the other of said clutch-pulleys may be engaged at will with the pulley G, which is rigidly secured to said axle between the clutch-pulleys, which latter are operated by means of suitable levers, (not shown,) and placed within the reach of the brakeman on the platform. From and around each of these clutch-pulleys, to and around the shaft H of the exhaust-fan, lead the belts I I′, the former being a straight belt and the latter a crossed belt.

When the car is running in one direction the clutch and straight belt are employed to run the fan. When the direction of the car is reversed, this clutch, by means of the lever above referred to, should be disengaged, and the operation brings into engagement the other clutch and crossed belt, securing the same motion to the fan.

The windows of a car provided with this apparatus should be fastened, so that passengers cannot open them, and in the floor or side walls of the car there should be openings, protected by suitable screens to exclude foreign substances, for admission of fresh air from the outside as fast as the inside air is exhausted.

I am aware that fans have been used in connection with railway cars for the purposes of ventilation, but such fans have always been blowing-fans, forcing outside air into the cars, and by means of such forcing compelling the air within the car to seek an outlet. This, however, has been abandoned for two reasons, to wit: that dangerous currents were created, rendering the occupants of the car liable to take cold by being compelled to sit in a draft; and, secondly, because the air thus forced in was taken from near the ground, and filled with the dust raised by the passing train. I am also aware that exhaust-fans have been employed to withdraw foul or dust-impregnated air from rooms in factories and mills. Consequently, I do not claim the broad principle of causing ventilation by means of exhaust-fans; but

What I claim as my invention, and desire to secure by Letters Patent, is—

1. The combination, with a railway-car, of an exhaust-fan placed under and connected with the interior of the car, and driven from one of the axles thereof, and openings in the walls of the car, whereby the air is exhausted from the inside of the car, and the equilibrium restored by air passing at the same time through the said openings, without the use of a blower, substantially as and for the purposes set forth.

2. The combination, with a railway-car, of an exhaust-fan placed under and connected with the interior of the car, and driven from one of the axles thereof, a pipe or pipes leading from the said exhaust-fan up through the floor of the car to a point near the ceiling, and openings in the walls of the car, operating without the use of a blower, substantially as described.

3. The combination, with a railway-car, of an exhaust-fan, placed under and connected with the interior of the car, a pipe or pipes leading from the said exhaust fan up through the floor of the car to a point near the ceiling thereof, a perforated false ceiling, behind which the open ends of said pipes terminate, and openings in the walls of the car, substantially as described and shown.

4. The axle F, clutch-pulleys E E, rigid pulley G, belts I I′, and exhaust-fan B, when combined with the platform or floor A of a railway-car, substantially as described.

In testimony that I am the inventor of the improvement herein described, I have affixed my signature this 9th day of December, 1875.

EDWD. E. HARGREAVES.

In presence of—
I. GLEESON,
CHAS. H. BOGAN.